June 25, 1957 O. J. POUPITCH Re. 24,333
CAN CARRIER DEVICE
Original Filed June 11, 1951 2 Sheets-Sheet 1
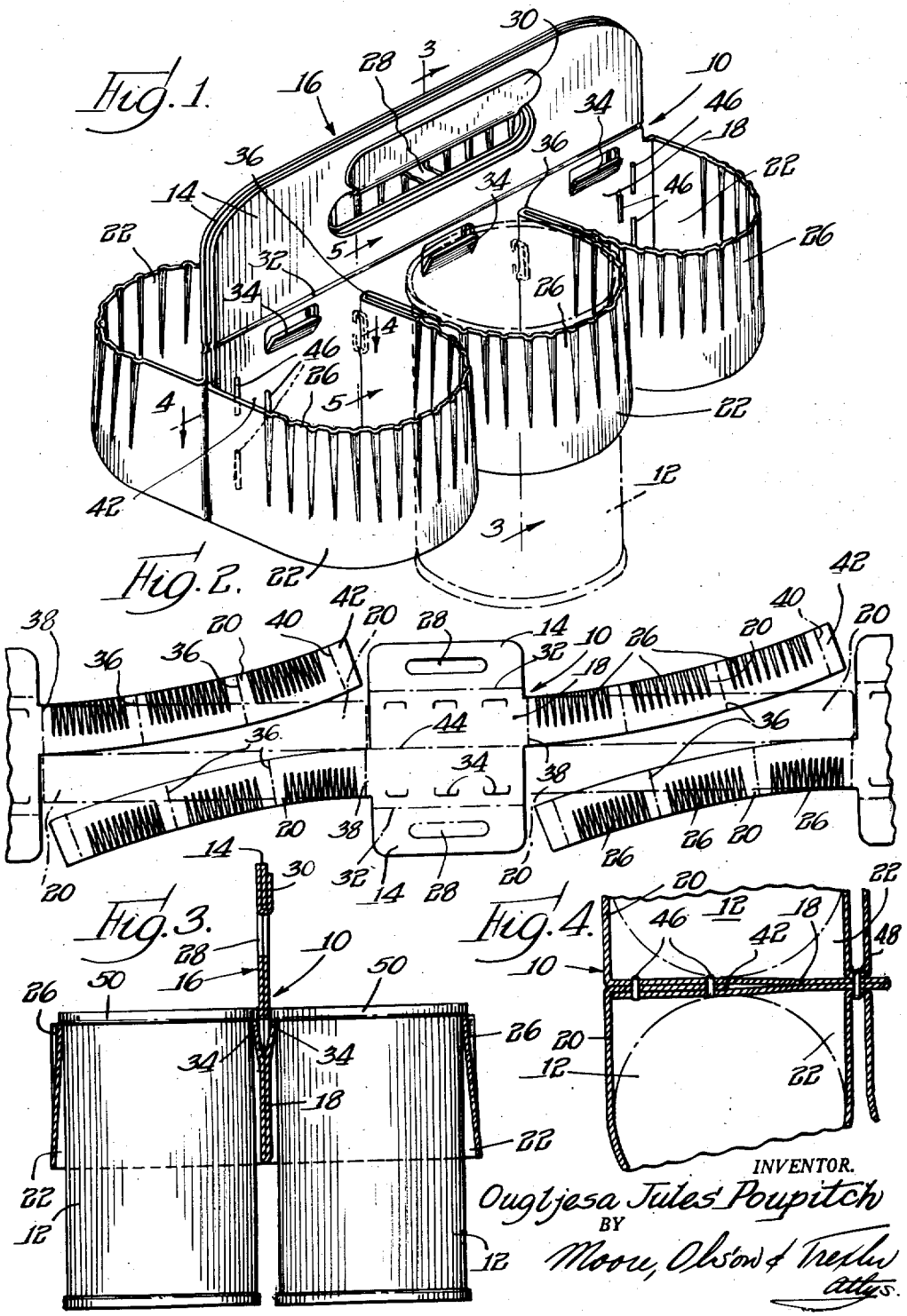
INVENTOR.
Ouglesa Jules Poupitch
BY
Moore, Olson & Trexler
Attys.

June 25, 1957 O. J. POUPITCH Re. 24,333
CAN CARRIER DEVICE
Original Filed June 11, 1951 2 Sheets-Sheet 2
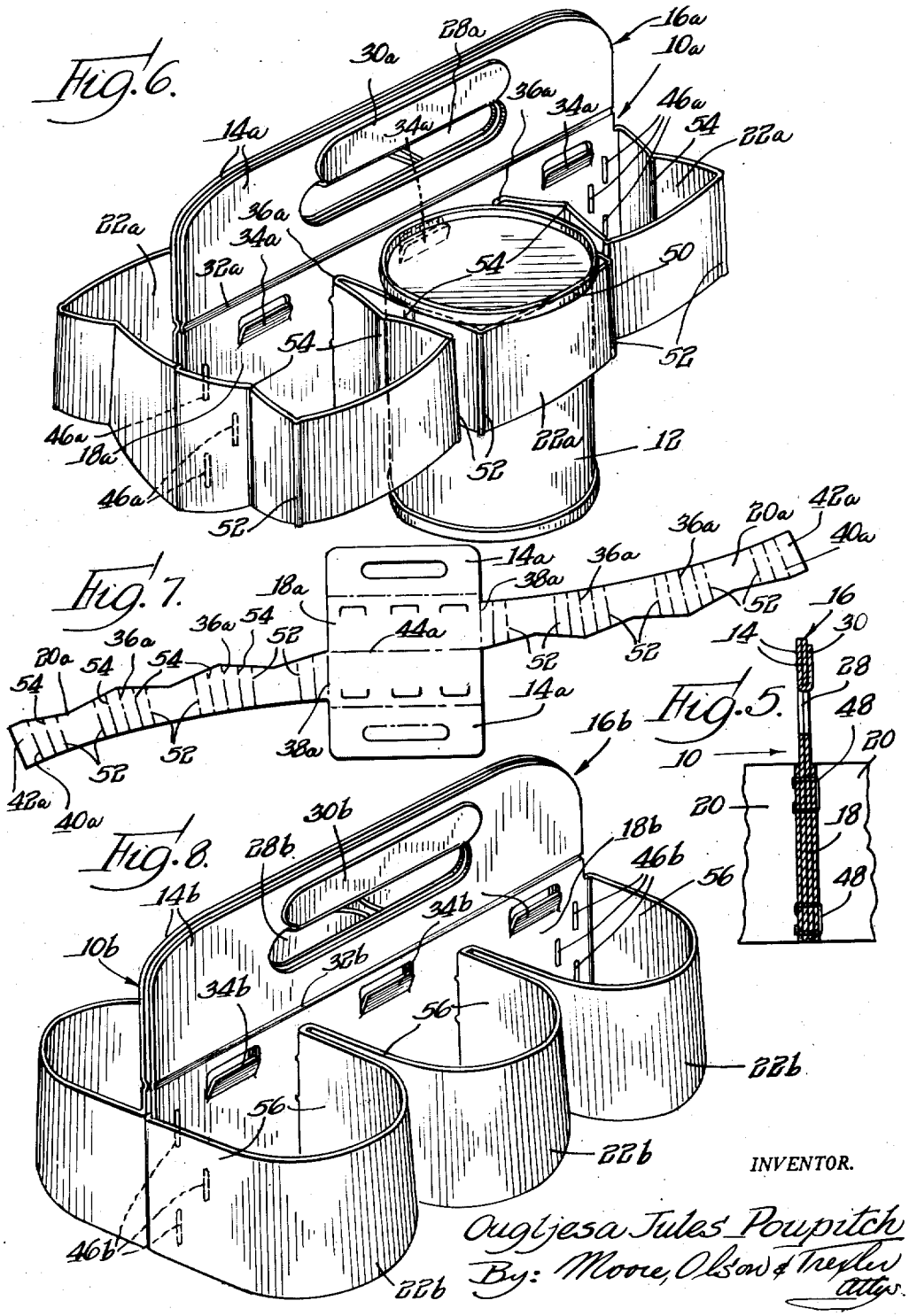
INVENTOR.
Ouglesa Jules Poupitch
By: Moore, Olson & Trexler
Attys.

United States Patent Office

Re. 24,333
Reissued June 25, 1957

24,333

CAN CARRIER DEVICE

Ouglješa Jules Poupitch, Itasca, Ill., assignor, by mesne assignments, to Lawrence O. Holmberg, Winnetka, Ill.

Original No. 2,740,657, dated April 3, 1956, Serial No. 230,879, June 11, 1951. Application for reissue March 20, 1957, Serial No. 647,464

20 Claims. (Cl. 206—65)

Matter enclosed in heavy brackets [ ] appears in the original patent but forms no part of this reissue specification; matter printed in italics indicates the additions made by reissue.

This invention relates to container carriers, and more particularly to such carriers having carrying handles and adapted for engaging and supporting the beaded extremities of cans and the like, such as those commonly used for beverages, food stuffs, etc.

The present invention is concerned primarily with carriers referred to above which are constructed with sheet material other than metal which material is bent or folded into the proper shape and held in place by means such as a plurality of wire staples.

An object of this invention is to provide a substantially non-metallic can carrier.

Another object of this invention is to provide a container carrier constructed of cardboard or the like which container is flat for shipment and is foldable into position to secure containers by the rims or beads thereof.

A further object of this invention is to provide a container carrier constructed of a single sheet of cardboard or the like and folded into position to secure a plurality of containers by the rims or beads thereof.

Yet another object of this invention is to provide a container carrier constructed of folded sheet material wherein the carrier and containers can be brought into carrying engagement after complete assembly of the carrier.

A still further object of this invention is to provide a container carrier constructed of cardboard or the like and having a plurality of substantially frustoconical or truncated conical compartments for receiving containers inserted from the bottom of the carrier and for retaining the containers by the upper rim or bead thereof, *the containers readily being removed from the top of the carrier.*

*It is another object of this invention to provide a container carrier of sheet material having container-receiving pockets with circumferentially deformable margins for engaging containers beneath beads thereon over an arc forming a substantial portion of the circumference of a container for resisting downward withdrawal, but permitting facile upward withdrawal.*

Other and further objects and advantages of the present invention will be apparent from the following description when considered in connection with the accompanying drawings wherein:

Fig. 1 is a perspective view of one embodiment of my invention;

Fig. 2 is a plan view showing carriers as stamped from a sheet of cardboard or the like;

Fig. 3 is a sectional view taken along the line 3—3 of Fig. 1;

Fig. 4 is a sectional view taken along the line 4—4 of Fig. 1;

Fig. 5 is a sectional view taken along the line 5—5 of Fig. 1;

Fig. 6 is a perspective view of a modified form of the invention;

Fig. 7 is a view similar to Fig. 2 showing the modification of Fig. 6; and

Fig. 8 is a further modification of my invention.

Referring now to the figures in greater particularity, a container carrier embodying the principles of my invention is identified generally by the numeral 10 in Figs. 1–5. Each container carrier 10 is designed to carry a plurality of containers, conveniently six in number, and illustrated as the conventional cylindrical cans 12 generally used for beverages, food stuffs, and other substances. Each container includes a pair of flaps 14 forming a handle portion 16, a body or separator portion 18, and a pair of web portions 20 formed into a plurality of upright compartments 22.

Each carrier 10 comprises a single sheet of cardboard or the like and successive containers are cut from a continuous strip with comparatively little waste as best may be seen in Fig. 2. The webs 20 of adjacent or successive carriers 10 initially lie adjacent one another as shown in dashed lines in Fig. 2. Each web is crimped as at 26 at spaced intervals along its upper or outer edge and the crimping pulls the web into an arcuate configuration as also may be seen in Fig. 2. In addition to the configuration of the carrier as stamped from the sheet of cardboard or the like as heretofore disclosed, the flaps 14 of the handle portion 16 are stamped to form elongated openings 28 one of which retains a tab 30 integrally connected to the flap 14 along the upper edge of the aperture 28. The cardboard or other sheet material is scored at 32 between the flaps 14 and the body portion 18 and outwardly and upwardly directed tabs 34 are struck from the body or separator portion 18. Additionally, the webs preferably are scored for folding between the crimped portions 26 as indicated by the dashed lines 36 in Fig. 2. Each web also preferably is scored at 38 where it joins with the body portion 18 and at 40 near the free end to leave a tab or ear 42.

Each web 20 is bent at right angles to the body portion at 38 and then is bent along the lines 36 and folded through the crimped sections 26 to form the compartments 22. The tabs or ears 42 are placed against the rear face of the body portion 18 and the body portion is folded along a longitudinal score line 44 to shape the carrier as shown in Fig. 1. The body portion is secured together at the ends by sets of staples 46 which also pass through the ears 42 to secure the ends of the webs 20 as best seen in Figs. 1 and 4. The portions of the webs along the score lines 36 are secured against the body portion 18 by vertically spaced staples 48. The crimping of the webs at 26 foreshortens the peripheral extent of the upper or outer edges of the webs so that when the body portion is stapled together with the webs as shown in Fig. 1, the compartments 22 are substantially conical in configuration as best may be seen in Figs. 1 and 3. Cans or other containers 12 readily fit within the comparatively large transverse dimensions at the bottoms of the compartments 22 and can be forced upwardly through the compartments, stretching the crimped upper edges somewhat and displacing the tabs somewhat upon passing them. The tabs 34 and upper edges of the compartments thus readily engage beneath the upper rims of beads 50 of the cans and prevent the cans from moving back downward out of the carrier without destroying the carrier.

*The crimping of the webs provides compartments or pockets having upper container-supporting margins that are circumferentially resiliently deformable. This, coupled with the frusto-conical shape, permits containers such as cans to be inserted readily from beneath the container. The substantially circumferentially continuous engage-*

*ment of the upper margins of the compartments or pockets with the cans beneath the beads thereof over arcs forming substantial portions of the circumferences of the cans provides firm support for the cans so that the cans cannot be readily withdrawn downwardly. However, upward withdrawal of the cans is quite simple. It will be observed that the arcuate upper margins in question all lie substantially in a common plane, and that this causes the cans to be supported in dependent fashion substantially parallel to one another, but having a slight permissive movement relative to one another by virtue of the deformability of the carrier including the pockets thereof.*

The upper flaps 14 constituting the handle portion are folded along the score lines 32 to horizontal position against the top surfaces of the cans 12 for shipment in cases in order to take up a minimum amount of room. In order to carry the half dozen cans in the carrier 10, the flaps or panels 14 are folded into parallel contacting relation and the tab 30 on one of the flaps is folded through the elongated aperture 28 in the other flap to retain the flaps in contiguous relation and to form a comfortable handle grip as shown in Figs. 1, 3 and 5, a score line preferably being provided to facilitate such folding. The cans 12 can be removed from the carrier 10 by shifting the cans upwardly in the container or by destroying the retainer.

A modified form of the invention is shown in Figs. 6 and 7 and similar parts in this modification are identified by similar numerals with the addition of the subscript "a." The handle portion 16a comprised of flaps 14a held together by the tab 30a remains as before. Similarly, the body portion 18a and tabs 34a struck therefrom remain as in the prior embodiment. The webs 20a differ from the webs 20 in that they are not crimped and originally are formed arcuately as seen in Fig. 7. In addition to the score lines 36a, 38a and 40a, the webs are provided with pairs of score lines 52 and 54. The compartments 22a are formed by bending the body portion 18a along the longitudinal score line 44a to bring the two halves of the body portion into juxtaposition with the ears or tabs 42a included between the halves and secured by staples 46a. The webs are reversely bent along the score lines 54 and are bent along the score lines 52 to form the compartments 22a as shown in Fig. 6. The webs are folded along the score lines 36a and stapled against the body portions 18a as disclosed heretofore.

The arcuate configuration of the webs causes the compartments 22a to be smaller across the top than the bottom to afford a substantially frusto-conical configuration as in the embodiment disclosed heretofore. The cans 12 are inserted from below and flex the web outwardly at the score lines 54 and also midway between the score lines 52 and these parts along with the tabs 34a spring in under the beads 50 of the cans to retain the cans for carrying.

A third embodiment of the invention is illustrated in Fig. 8. The modification of Fig. 8 is in many respects similar to the embodiments shown heretofore and specific references need not be made to similar parts which are identified by the same numerals as used heretofore with the addition of the subscript "b." The webs are initially formed arcuately to present an arcuate outline similar to that shown in solid lines in Fig. 2 without the necessity of crimping. The container 10b thus formed presents an appearance identical with that shown in Figs. 1–5 except for the lack of crimping, the compartments being frusto-conical as before. The side walls 56 of the compartments are substantially flat and may flex outwardly slightly, although most of the flexing is done by the tabs 34b as the cans are inserted from below following complete assembly of the carrier. As in the previous forms of the invention, the cans can be removed by pushing them upwardly from the carrier, or by destroying the carrier.

The container carrier as disclosed herein is quite strong and is substantially non-metallic, thus reducing to a minimum the use of metal in the fabrication thereof. The upstanding handle on the carrier provides space for marking and indicating contents of the containers, the manufacturer, and other useful information. The carrier occupies a minimum of space in shipment and readily is folded into the required configuration for carrying. The cans or other containers in the carrier are held securely and yet may be removed readily by upward movement from the container or by partial destruction of the carrier.

The particular embodiments of my invention shown and described herein are for illustrative purposes only. Various changes can be made in the constructional details without departing from the spirit and scope of the invention and it is to be understood that my invenion therefore is to include all that which falls within the spirit and scope of the appended claims.

I claim:

1. A carrier for engagement with the upper rims of adjacent containers, as for example cans with beaded rims, comprising sheet material folded to form a plurality of adjacent compartments respectively for receiving a single container and being substantially in the form of truncated cones having both ends open and upper edges for engaging and supporting the upper rims of containers, said compartments being wider at the bottom than at the top to facilitate insertion of containers, a handle portion extending upwardly from said compartments, and at least one tab of said sheet material extending upwardly into each of said compartments and flexibly attached to a side wall of each compartment and permitting passage of container rims upwardly and restraining said rims against downward movement.

2. A carrier for engagement with the upper rims of adjacent containers, as for example cans with beaded rims, comprising a substantially flat vertical body portion, a web of sheet material folded into a series of loops substantially abutting one another, and means for attaching said web at spaced intervals to said body portion to define a series of adjacent, substantially abutting compartments respectively for receiving a single container and being open at both ends with the opening at the top smaller than the opening at the bottom and having an upper edge for engaging and supporting the upper rims of containers.

3. A carrier for engagement with the upper rims of adjacent containers, as for example cans with beaded rims, comprising a substantially flat body portion of sheet material, two webs of sheet material each projecting integrally from one edge of said body portion and folded into a series of loops, and means for attaching said webs to said body portion at spaced intervals to define a series of adjacent compartments respectively for receiving a single container and being open at top and bottom and having an upper edge for engaging and supporting upper rims of containers.

4. A carrier for engagement with the upper rims of adjacent containers, as for example cans with beaded rims, comprising a substantially flat body portion of sheet material, a web of sheet material folded into a series of loops, means for attaching said web to said body portion at spaced intervals to define a plurality of adjacent compartments respectively for receiving a single container and being open at top and bottom, said compartments having upper edges for engaging and supporting the upper rims of containers, and a plurality of tabs struck from said body portion and projecting upwardly into said compartments to cooperate with said upper edges in engaging and supporting upper rims of containers.

5. A carrier for engagement with the upper rims of adjacent containers, as for example, cans with beaded rims, comprising a substantially flat body portion, a web having an upper edge with an over-all length shorter than a lower edge, said web being folded into a series of loops, and means for attaching said web to said body portion at spaced intervals to form a series of open ended compartments respectively for receiving a single container, said compartments being smaller at the top than at the bottom due to the short upper edge of said web to facilitate insertion of containers into said compartments from the bottom thereof for support by engagement of said upper edge beneath the upper rims of the containers, said upper edge lying substantially in a plane perpendicular to said body portion.

6. A carrier as set forth in claim 5 wherein the relatively short over-all length of the upper edge of the web is provided by crimping the upper portion of said web.

7. A carrier as set forth in claim 5 where said web is arcuately formed to provide the shorter upper edge.

8. A carrier as set forth in claim 5 wherein the upper edges of the compartments are resiliently flexible outwardly to permit passage of the upper rim of a container past them from below and automatically collapsible to prevent passage of said rim downwardly.

9. A carrier for engagement with the upper rims of adjacent containers, as for example cans with beaded rims, comprising a substantially flat body portion of sheet material, a handle integral with said body portion and upstanding therefrom, a web of sheet material folded to form a plurality of loops, and means for attaching said web to said body portion at spaced intervals to form a plurality of adjacent compartments respectively for receiving a single container and being open at either end and having upper edges for engaging and supporting the upper rims of containers, said upper edges lying substantially in a plane perpendicular to said body portion.

10. A carrier for engagement with the upper rims of adjacent containers, as for example cans with beaded rims, comprising a pair of superposed panels of sheet material forming a body portion, a pair of webs integral with said panels and folded into a series of loops, said webs having at least one end lying outwardly of one edge of said panels and bent inwardly between said pair of panels, and means for attaching said webs to said panels at spaced intervals to form a plurality of open ended compartments respectively for receiving a single container and having upper edges for engaging and supporting the upper rims of containers.

11. A carrier for engagement with the upper rims of adjacent containers, as for example cans with beaded rims, comprising a pair of superposed panels of sheet material forming a body portion, two webs of sheet material each integral at one end with and extending from one edge of one of said panels, said web being folded into a plurality of loops and the other end thereof being positioned between said pair of panels, and means for securing said web to said body portion at spaced intervals to form a plurality of compartments respectively for receiving a single container and having upper edges for engaging and supporting the upper rims of containers.

12. A carrier for engagement with the upper rims of adjacent containers, as for example cans with beaded rims, comprising a pair of superposed panels of sheet material, a pair of webs of sheet material each integral at one end with and extending from one edge of a different one of said panels, each of said webs being folded into a series of loops, the other ends of said webs being positioned between said panels, and fastening means passing through said webs and said panels to secure said webs and panels together to form a plurality of adjacent compartments respectively for receiving a single container and having upper edges for engaging and supporting the upper rims of containers.

13. A carrier for engagement with the upper rims of adjacent containers, as for example cans with beaded rims, comprising a pair of panels of sheet material superposed to form a body portion, of a pair of webs of sheet material, each web being shorter along the upper edge than along the bottom edge and folded into a succession of loops, and fastening means passing through said webs and said panels at spaced intervals to form a plurality of adjacent open ended compartments respectively for receiving a single container, said compartments being smaller at the upper ends than at the lower ends by virtue of the short upper edges of said webs to facilitate insertion of containers from the bottoms of said compartments, the upper edges of said compartments lying substantially in a plane perpendicular to said panels and engaging beneath the rims of said containers to support said containers.

14. A carrier for engagement with the upper rims of adjacent containers, as for example cans with beaded rims, comprising a pair of integral panels folded together to form a body portion, a pair of webs of sheet material each integral at one end with different ones of said panels, said webs being folded into a succession of loops and the free ends thereof positioned between said panels, means securing said webs to said panels at spaced intervals to form a plurality of adjacent compartments respectively for receiving a single container and being open at top and bottom and having upper edges for engaging and supporting the upper rims of containers, a handle upstanding from said body portion, and a plurality of tabs struck from said panels and extending upwardly into said compartments to cooperate with said upper edges in supporting the rims of said containers.

15. A carrier for engagement with the upper rims of adjacent containers, as for example cans with beaded rims, comprising a plurality of integral panels of sheet material folded together to form a body portion, a plurality of webs of sheet material each integral at one end on a different one of said panels, said webs each being folded into a succession of loops and having their free ends positioned between said panels, means for fastening said webs to said panels at spaced intervals to form a plurality of adjacent compartments respectively for receiving a single container and having upper edges for engaging and supporting the upper rims of containers, a plurality of tabs struck from said panels and extending upwardly into said compartments to cooperate with said upper edges in supporting the upper rims of said containers, a plurality of integral upward extensions on each of said panels, each of said extensions being apertured to form handle portions.

16. A carrier for engagement with the upper rims of adjacent containers, as for example cans with beaded rims, comprising a pair of integral panels of sheet material folded flat against each other to form a body portion, a pair of webs of sheet material each integral at one end with a different one of said panels, said webs being folded into a succession of loops and having their free ends positioned betwen said panels, means securing said webs to said panels at spaced intervals to form a plurality of adjacent open ended compartments respectively for receiving a single container and being smaller at the upper ends than at the lower ends to facilitate the insertion of containers therein from the lower ends for support by engagement of the upper edges of said compartments beneath the upper rims of said containers, a handle upstanding from said body portion, and a plurality of tabs struck from said panels and extending upwardly into said compartments to cooperate with the upper edges of the compartments in supporting containers by the upper rims.

17. A carrier as set forth in claim 15 wherein the upper edge of each web is crimped to form the compartments smaller at the tops than at the bottoms.

18. A carrier as set forth in claim 15 wherein each web originally is formed arcuately to afford an upper edge which is shorter than the lower edge to provide the compartments smaller at the tops than at the bottoms.

*19. A carrier for engagement with cans beneath the upper radially outwardly projecting beaded rims of cans comprising sheet material formed to provide a plurality of adjacent can-receiving pockets, each pocket being adapted to receive a single can and having both ends open and having upper margins which are circumferen-*

*tially resiliently deformable and which are substantially continuous over a substantial arc, such margins of all of the pockets being substantially in a common plane; for substantially continuous circumferential engagement with a can beneath the upper bead thereof over an arc forming a substantial portion of the circumference of the can, said pockets being wider at the bottom than at the top to facilitate insertion of the cans from the bottom of the pockets, and to resist downward movement of the cans while permitting facile upward withdrawal, and means associated with said sheet material providing a handle for lifting said carrier.*

*20. A container package comprising a plurality of cylindrical cans of predetermined diameter and having circumferential beads of greater diameter at the top and bottom ends, and a carrier holding said cans and comprising sheet material formed to provide a plurality of adjacent can-receiving pockets, each of said pockets receiving a single can and having both ends open and having upper margins which are circumferentially resiliently deformable and which are substantially continuous over a substantial arc, such margins of all of the pockets being substantially in a common plane, each such margin being*

*in substantially continuous circumferential engagement with a can beneath the upper bead thereof over an arc forming a substantial portion of the circumference of the can, all of said cans being supported in depending, substantially parallel arrangement, said pockets at the bottom having an internal diameter at least as great as the bead diameter to facilitate insertion of cans from the bottom, said pockets at the top being of lesser diameter than the bead diameter and engaging the cans beneath the beads thereof to resist downward withdrawal of the cans but by virtue of their circumferential resilient deformability allowing ready upward withdrawal of the cans; and means associated with said sheet material providing a handle for lifting said package.*

References Cited in the file of this patent or the original patent

UNITED STATES PATENTS

| | | |
|---|---|---|
| D. 162,515 | Burge | Mar. 20, 1951 |
| 2,405,753 | Morgan | Aug. 13, 1946 |
| 2,514,858 | Gray | July 11, 1950 |